April 19, 1932. J. R. PALAGONIA 1,854,996
COMPRESSED AIR PARACHUTE
Filed Feb. 24, 1931 2 Sheets-Sheet 1
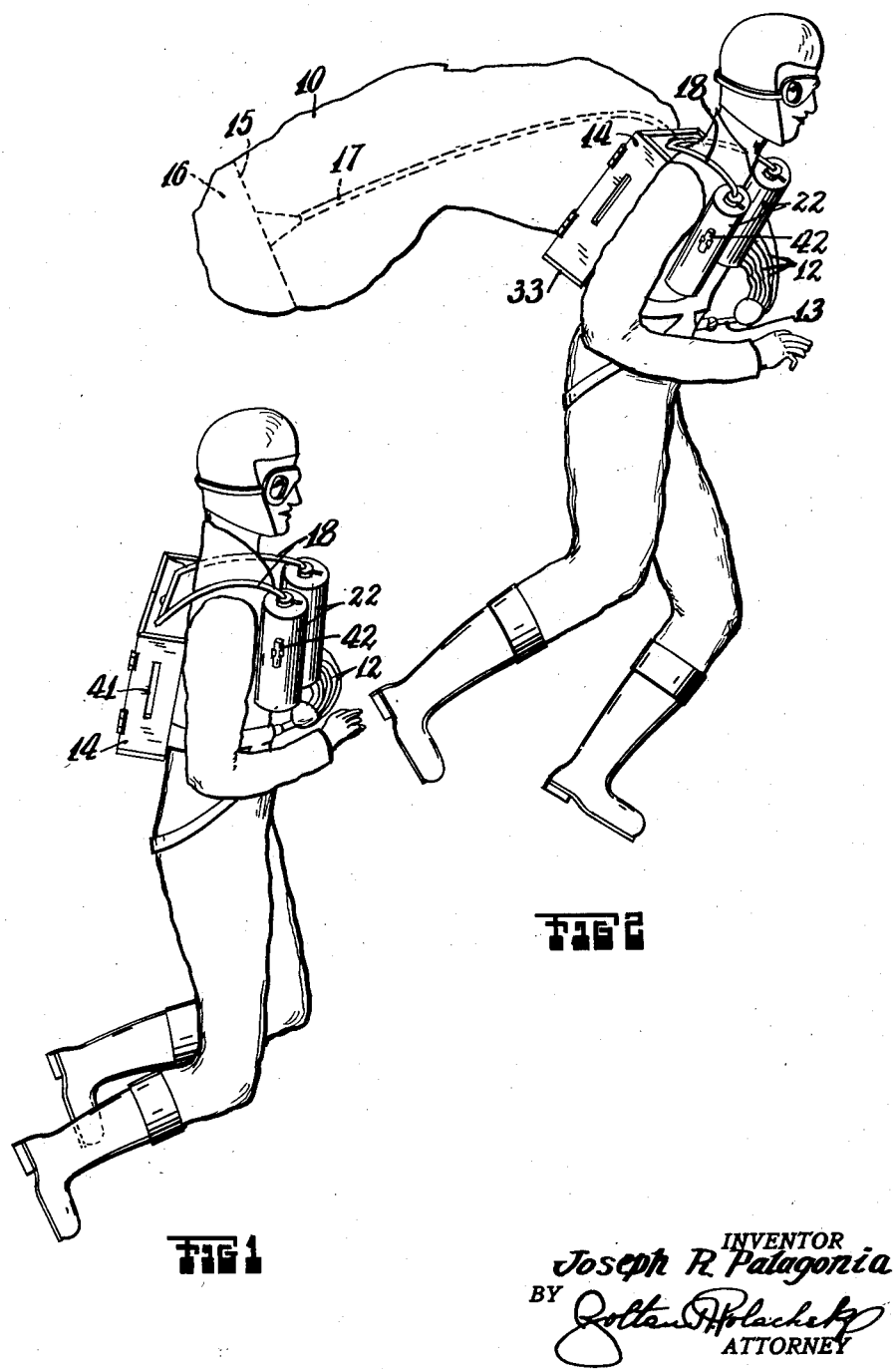

April 19, 1932. J. R. PALAGONIA 1,854,996
COMPRESSED AIR PARACHUTE
Filed Feb. 24, 1931 2 Sheets-Sheet 2
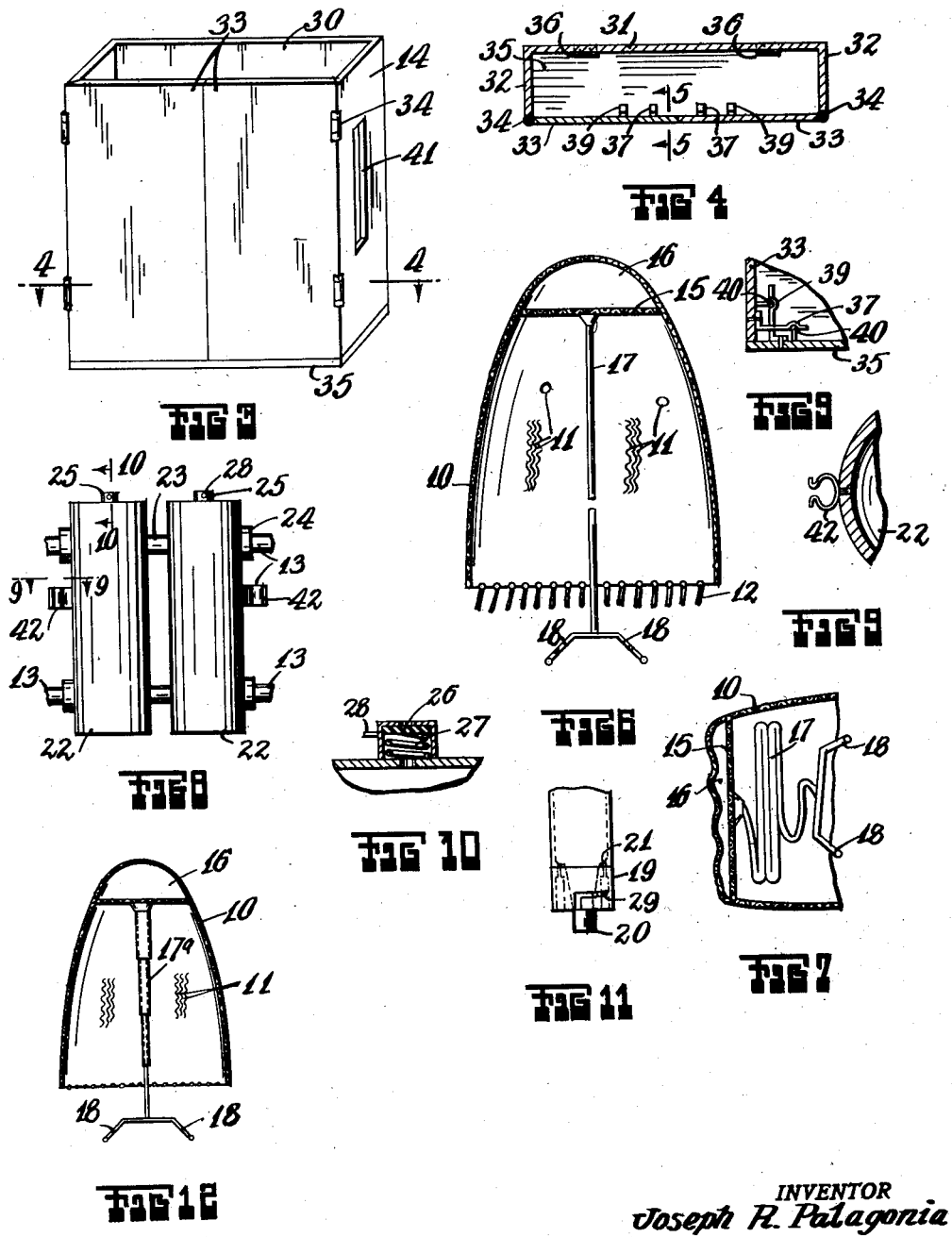
INVENTOR
Joseph R. Palagonia
BY
ATTORNEY Patented Apr. 19, 1932

1,854,996

UNITED STATES PATENT OFFICE

JOSEPH R. PALAGONIA, OF GLENDALE, NEW YORK

COMPRESSED AIR PARACHUTE

Application filed February 24, 1931. Serial No. 517,678.

This invention relates to new and useful improvements in a compressed air parachute.

The invention has for an object the provision of a compressed air parachute which is characterized by a parachute sail having a transverse plate across its top portion to divide off a small chamber which is connected with a flexible air tube extending along the axis of the parachute sail to the bottom for connection with a supply of air which is capable of straightening out the tube and inflating the small compartment and thus insuring the opening of the parachute.

It is a still further object of this invention to provide a casing for attachment upon a person's back and having back doors and bottom door and capable of housing said parachute normally when the latter element is in its inoperative condition. The doors of the casing should be so arranged as to diametrically open upon the application of compressed air through the flexible tube and into the divided off chamber.

Furthermore as another object of this invention it is proposed to provide tanks of light metal such as aluminum for attachment upon a person to constitute the necessary compressed air supply for insuring the opening of the parachute.

A still further object of this invention is to arrange holders on the sides of the tanks for normally holding the end of the flexible air tube and to arrange valves on the tanks and a pin on the end of the tube so that the tube may be disconnected from the holder and engaged upon the tank to open the valve and allow the discharge of the compressed air through the tube.

As a still further object of this invention it is proposed to substitute a telescopic tube in place on the flexible tube before mentioned.

Furthermore as a still further object of this invention it is proposed to construct a compressed air parachute which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a person equipped with a compressed air parachute according to this invention and in the act of jumping.

Fig. 2 is a similar view to Fig. 1, except showing the parachute partially open.

Fig. 3 is a perspective view of the housing used with this invention.

Fig. 4 is a horizontal sectional view taken on the line 4—4 of Fig. 3.

Fig. 5 is a fragmentary sectional view taken on the line 5—5 of Fig. 4.

Fig. 6 is an enlarged detailed transverse sectional view of the parachute, per se.

Fig. 7 is a fragmentary portion of the parachute shown in Fig. 6, but showing the flexible tube in a folded condition.

Fig. 8 is an elevational view of the air tanks used in conjunction with the parachute.

Fig. 9 is a fragmentary horizontal sectional view taken on the line 9—9 of Fig. 8.

Fig. 10 is a fragmentary vertical sectional view taken on the line 10—10 of Fig. 8.

Fig. 11 is a fragmentary detailed elevational view of the end of the flexible tube.

Fig. 12 is a view similar to Fig. 6, but illustrating a modified construction.

The compressed air parachute according to this invention comprises a parachute sail 10 which may be made of cloth material or any other material conventionally used for parachute sails. As shown on the drawings, the parachute sail is provided with a plurality of small openings 11 through which the air can slowly escape so as to cause the device to slowly descend when in use. Along the bottom edge of the parachute sail there is a plurality of cords 12 for connection with a strap arrangement 13 adapted to be engaged about the body of a user. In Fig. 1 the parachute is shown completely hid within a casing 14 for this purpose. In Fig. 2 the parachute sail 10 is shown in the act of opening.

A transverse metallic plate 15 is secured across the top portion of the parachute sail so as to divide off a small chamber, indicated by reference numeral 16. The sheet 15 preferably should be of aluminum or other light metal. The chamber 16 is of substantially semi-spherical shape and a flexible tube 17 arranged coaxially within the parachute sail connects with the plate 15 and discharges into the chamber 16. It should be understood that when compressed air is forced through the flexible tube 17 and completely fills the chamber 16, these portions will become very rigid and act as an umbrella causing the opening of the parachute sail.

The flexible tube 17 should be made of some hard material which is bendable but which does not crease, so that there is no possibility of the passage of air through it being choked. In Fig. 7 the flexible tube 17 is shown folded up as it would appear when the device is housed within the casing 14. At the free end the flexible tube has a pair of branches 18, each one of which terminates in a cap 19 having a pin portion 20. This pin is hollow so as to allow the passage of the air and in addition a plurality of apertures 21 are formed around the pin and in the cap portion so as to further enlarge the passage which the compressed air may take.

A means is provided to supply compressed air to the tube and the chamber 14, and comprises a pair of compressed air tanks 22. These tanks are attached to each other by brackets 23 and are provided with loop members 24 to which the strap structure 13 is attached. This allows the tanks to be firmly attached upon the front of the person using the device, as clearly shown in Figs. 1 and 2. Preferably, the tanks should be of aluminum or other light metal. At the tops of each of the tanks there is a projection 25 which constitutes a valve body. A valve 26 is housed within this projection and is urged into closed position by a spring 27. A peg 28 projects from the exterior of the projection 25 and is engageable in a bayonet slot 29 formed in the tip 19. This construction allows each one of the branches 18 of the flexible tube 17 to be attached upon the projections 25 of the tanks 22 in such a manner that the pins 20 press down and open the valves 26. Then the compressed air within the tanks may flow through the tube 17 as before mentioned.

Further, a means is provided for housing the parachute sail when it is not in use. This means is in the form of the casing 14, which comprises a light box preferably formed from sheet aluminum. This box is opened at the top 30. It is formed from a sheet of material bent so as to have a back portion 31 and side portions 32. Front doors 33 are hingedly connected at their outer ends 34 upon the edges of the side portions 32 and a bottom door 35 is hingedly connected at its back edge as at 36 upon the lower edge of the back portion 31 of the casing. Then a plurality of spring clips serve to hold the various doors resiliently closed.

These spring clips comprise substantially horizontal clips 37 projecting from each of the doors 33 and engageable upon studs 38 projecting from the bottom door 35 and other spring clips 39 which are vertical and which are attached upon the bottom door 35 and which engage studs 40 projecting from the front doors 33. Thus the various doors are held latched, but upon expansion within due to the inflation of the parachute, the various spring clips will resiliently give and allow the opening of the doors. Side vent openings 41 are formed within the sides 32 for the purpose of allowing the passage of wind. Catches 42 upon the sides of the tanks 22 are for the purpose of normally holding the branch tubes 18 when the device is not in use.

In Fig. 12 a modified construction of the device has been shown in which a telescopic tube 17ᵃ is used in lieu of the flexible tube 17. This telescopic tube may collapse to assume the closed position and upon the passage of compressed air into the compartment 16, a pressure will be exerted between the back portion 31 of the casing 14 and the front doors 33 which will cause the opening of the casing and thereafter which will cause the extension of the parachute sail and thus insure its opening.

It is to be understood that the valve 26 may be made to operate in any other suitable manner, for instance, it may be forced in by the tube 18 in order to open the same and to allow the compressed air to pass thru branches 18.

The operation of the device may be traced by assuming it in the condition as shown in Fig. 1 with the exception that the branch tubes 18 be engaged within the holders 42 instead of upon the tops of the tanks as shown. Before the person jumps from the airplane, he disengages the branch tubes 18 from the clips 42 and holds them directly over the projections 25 on the top of the tanks 22. Then the jump is made and after a sepcified length of time to make certain that the person has left the plane and there is no likelihood of the parachute sail becoming entangled with the plane, the branch tubes 18 are engaged tightly upon the projections 25 and slightly turn so that the pins 28 engage the bayonet slots 29. The compressed air from the tanks will then flow through the branch pipes and through the flexible tube 17 and cause the straightening out of the tube and the inflating of the top of the parachute sail which will act as an umbrella to partially open the parachute sail. Immediately the onrushing air will enter beneath the sail and conclude the opening of it.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A compressed air parachute, comprising a parachute sail with a plurality of cords along its lower edge for connection with straps for engagement upon a user, a transverse rigid plate across the top portion of the parachute sail so as to divide off a dome shaped chamber, a flexible hard air tube extending from the center of said chamber to the bottom of the parachute sail, and means for causing the inflation of the chamber and the straightening out of the flexible tube by reason of supplying compressed air within these parts, comprising compressed air tanks for attachment upon the user of the device and provided with valves automatically openable upon engagement of branch pipes from said flexible tube over and upon the bodies of the valves.

2. A compressed air parachute, comprising a parachute sail with a plurality of cords along its lower edge for connection with straps for engagement upon a user, a transverse rigid plate across the top portion of the parachute sail so as to divide off a dome shaped chamber, a flexible hard air tube extending from the center of said chamber to the bottom of the parachute sail, and means for causing the inflation of the chamber and the straightening out of the flexible tube by reason of supplying compressed air within these parts, comprising compressed air tanks for attachment upon the user of the device and provided with valves automatically openable upon engagement of branch pipes from said flexible tube over and upon the bodies of the valves, expansion springs serving to urge said valves closed, and pins projecting from said branch tubes for engaging against the valve heads to move them to the opened positions.

3. A compressed air parachute, comprising a parachute sail with a plurality of cords along its lower edge for connection with straps for engagement upon a user, a transverse rigid plate across the top portion of the parachute sail so as to divide off a dome shaped chamber, a flexible hard air tube extending from the center of said chamber to the bottom of the parachute sail, and means for causing the inflation of the chamber and the straightening out of the flexible tube by reason of supplying compressed air within these parts, comprising compressed air tanks for attachment upon the user of the device and provided with valves automatically openable upon engagement of branch pipes from said flexible tube over and upon the bodies of the valves, expansion springs serving to urge said valves closed, and pins projecting from said branch tubes for engaging against the valve heads to move them to the opened positions, other pins projecting from the valve bodies and engageable in bayonet slots formed in the ends of the branches for the connection of these parts.

4. In a compressed air parachute, a parachute sail with a plurality of cords along its lower edge for connection with straps for engagement upon a user, a transverse rigid plate across the top portion of the parachute sail so as to divide off a dome shaped chamber, a flexible hard air tube extending from the center of said chamber to the bottom of the parachute sail, and means for causing the inflation of the chamber and the straightening out of the flexible tube by reason of supplying compressed air within these parts, tanks being provided for holding said compressed air, and brackets being arranged upon the sides of the tanks for normally holding the flexible tube in an inoperative position.

5. A compressed air parachute, comprising a parachute sail with a plurality of cords along its lower edge for connection with straps for engagement upon a user, a transverse rigid plate across the top portion of the parachute sail so as to divide off a dome shaped chamber, a flexible hard air tube extending from the center of said chamber to the bottom of the parachute sail, and means for causing the inflation of the chamber and the straightening out of the flexible tube by reason of supplying compressed air within these parts, comprising compressed air tanks for attachment upon the user of the device and provided with valves automatically openable upon engagement of branch pipes from said flexible tube over and upon the bodies of the valves, means for urging said valves closed, and pins projecting from said branch tubes for engaging against the valve heads to move them to the opened positions.

6. A compressed air parachute, comprising a parachute sail with a plurality of cords along its lower edge for connection with straps for engagement upon a user, a transverse rigid plate across the top portion of the parachute sail so as to divide off a dome shaped chamber, a flexible hard air tube extending from the center of said chamber to the bottom of the parachute sail, and means for causing the inflation of the chamber and the straightening out of the flexible tube by reason of supplying compressed air within these parts, comprising compressed air tanks for attachment upon the user of the device and provided with valves automatically openable upon engagement of branch pipes from said flexible tube over and upon the bodies of the valves, expansion springs serving to urge said valves closed, and means for engaging against the valve heads to move them to the opened positions.

7. A compressed air parachute, comprising a parachute sail with a plurality of cords along its lower edge for connection with straps for engagement upon a user, a transverse rigid plate across the top portion of the parachute sail so as to divide off a dome shaped chamber, a flexible hard air tube extending from the center of said chamber to the bottom of the parachute sail, and means for causing the inflation of the chamber and the straightening out of the flexible tube by reason of supplying compressed air within these parts, comprising compressed air tanks for attachment upon the user of the device and provided with valves automatically openable upon engagement of branch pipes from said flexible tube over and upon the bodies of the valves, expansion springs serving to urge said valves closed, and pins projecting from said branch tubes for engaging against the valve heads to move them to the opened positions, and means for connecting the valve bodies and the ends of the branches.

In testimony whereof I have affixed my signature.

JOSEPH R. PALAGONIA.